US007475786B2

(12) United States Patent
McVay

(10) Patent No.: US 7,475,786 B2
(45) Date of Patent: Jan. 13, 2009

(54) CAN COATINGS, METHODS FOR COATING CAN AND CANS COATED THEREBY

(75) Inventor: Robert L. McVay, Cincinnati, OH (US)

(73) Assignee: PPG Industries Ohio, Inc., Cleveland, OH (US)

( * ) Notice: Subject to any disclaimer, the term of this patent is extended or adjusted under 35 U.S.C. 154(b) by 463 days.

(21) Appl. No.: 11/196,586

(22) Filed: Aug. 3, 2005

(65) Prior Publication Data

US 2007/0032606 A1 Feb. 8, 2007

(51) Int. Cl.
*B65D 8/04* (2006.01)
*B05D 1/02* (2006.01)
*B32B 1/02* (2006.01)
*B05D 3/00* (2006.01)

(52) U.S. Cl. .............. 220/62.13; 220/62.11; 220/62.12; 427/385.5; 427/388.1; 427/421.1; 427/427.5; 525/534; 525/540; 428/34.1; 428/474.4; 428/500

(58) Field of Classification Search ................ 428/34.1, 428/413, 418, 474.4, 500, 522, 523; 525/523, 525/534, 540; 220/62.11, 62.12, 62.13; 427/385.5, 427/388.1, 422.1, 427.1, 427.5
See application file for complete search history.

(56) References Cited

U.S. PATENT DOCUMENTS

| | | | | |
|---|---|---|---|---|
| 4,324,822 | A * | 4/1982 | Kobayashi et al. | 220/62.14 |
| 5,998,508 | A | 12/1999 | Corley et al. | 523/414 |
| 6,013,757 | A * | 1/2000 | Corley et al. | 528/289 |
| 6,114,430 | A | 9/2000 | Paulson et al. | 524/432 |
| 2002/0123560 | A1* | 9/2002 | Audenaert et al. | 524/588 |
| 2005/0222345 | A1* | 10/2005 | Nakayama et al. | 525/419 |

FOREIGN PATENT DOCUMENTS

| | | | |
|---|---|---|---|
| EP | 0 838 537 | A1 | 4/1998 |
| JP | 07-016982 | | 1/1995 |
| WO | 95/33869 | A | 12/1995 |
| WO | 98/46689 | A | 10/1998 |
| WO | 03/097744 | A | 11/2003 |
| WO | WO 03/102079 | A1 * | 12/2003 |
| WO | 2004/020541 | A | 3/2004 |

* cited by examiner

*Primary Examiner*—Michael J Feely
(74) *Attorney, Agent, or Firm*—Diane R. Meyers

(57) ABSTRACT

Compositions for coating food cans comprising a film-forming resin and an amine-terminated polyamide are disclosed. Food cans coated with such a coating, and methods for coating food cans, are also disclosed.

15 Claims, No Drawings

CAN COATINGS, METHODS FOR COATING CAN AND CANS COATED THEREBY

FIELD OF THE INVENTION

The present invention relates to coatings comprising an amine-terminated polyamide. Cans coated with such a coating and methods for coating cans are also within the scope of the present invention.

BACKGROUND INFORMATION

Coatings are typically applied to the interior of metal food and beverage containers to prevent the contents from contacting the metal surface of the container. Contact with certain foods, particularly acidic products, can cause the metal container to corrode. This corrosion results in contamination and deterioration in the appearance and taste of the food or beverage product.

The internal protective coating applied to metal cans is typically one that has low extractibles to avoid contamination of the contents. The coating may also be substantially defect-free, and possess high resistance to a wide variety of foods and beverages. Good adhesion to metal surfaces is also desired, as is good wetting, to ensure complete coverage of the metal and to protect the metal during baking and forming operations. The high temperatures needed to achieve rapid curing speeds, however, often result in blistering of the coating. Blistering typically occurs as cure temperature passes through the boiling point of water and can result in incomplete or weakened coverage of the can interior. After can fabrication, the coating should withstand the relatively stringent temperature and pressure requirements to which cans are subjected during food processing and should provide the necessary level of corrosion resistance to the cans once filled.

SUMMARY OF THE INVENTION

The present invention is directed to a composition for coating food cans comprising a film-forming resin and an amine-terminated polyamide. Food cans coated with such coatings and methods for coating food cans are also within the scope of the present invention.

DETAILED DESCRIPTION OF THE INVENTION

The present invention is directed to a composition for coating food cans comprising a film-forming resin and an amine-terminated polyamide. The term "food cans" is used herein to refer to cans, containers or any type of metal receptacle for holding any type of food or beverage. The present compositions can be used as a "one component" or "single package" formulation.

The amine-terminated polyamide of the present invention can be any such polyamide that has the appropriate reactivity; that is, the polyamide should react with the film-forming resin at appropriate temperatures and duration to form additional amide bonds; particularly suitable parameters include a temperature of 415° F. for 90 seconds peak metal temperature. Other typical can processing parameters may also be suitable. In certain embodiments, the amine-terminated polyamide may have a viscosity of 50,000 to 75,000 cps at 40° C. It will be appreciated that such a compound may be fairly unreactive or slow for certain applications, but is appropriate for the present invention. It will be further appreciated that if the reactivity of the polyamide is too high, resulting in a reaction that is too fast, the coating will blister upon baking.

Typically, amine-terminated polyamides are used as curing agents or hardeners with liquid epoxy resins, and are used in one component of a two-component or two-package system. The present coatings can be used in a single package and in certain embodiments contains little or no oxirane oxygen groups to react with the amine groups on the amine-terminated polyamide. Instead, it has been learned that the amine groups on the amine-terminated polyamide react with the carboxyls on the film-forming resin, such as an acrylic or epoxy-acrylic, to form additional amide bonds; this is believed to provide additional corrosion resistance to the coating, although the inventor does not wish to be bound by this mechanism.

An amine-terminated polyamide can be formed, for example, by reacting a multifunctional carboxylic acid and/or carboxylic acid derivative with a multifunctional amine, wherein the amine functional groups exceed the number of carboxylic acids/carboxylic acid derivative groups. Alternatively, suitable amine-terminated polyamides are commercially available from Resolution in their EPI-KURE line.

Any film-forming resin suitable for use with food cans can be used according to the present invention. Examples of polymers useful in forming the resin include hydroxyl or carboxylic acid-containing acrylic copolymers, hydroxyl or carboxylic acid-containing polyester polymers, isocyanate or hydroxyl containing polyurethane polymers, and amine or isocyanate containing polyureas. These polymers are further described in U.S. Pat. No. 5,939,491, column 7, line 7 to column 8, line 2; this patent, as well as the patents referenced therein, are incorporated by reference herein. Particularly suitable film-forming resins are acrylic resins and epoxy-acrylic resins, such as those described in U.S. Pat. No. 4,212,781, incorporated by reference herein. Other epoxy-acrylics can also be used. Curing-agents for these resins are also described in the '491 patent at column 6, lines 6-to 62; particularly suitable crosslinkers, especially for epoxy-acrylic resins and acrylic resins, include melamine, benzoguanamine, and phenolic crosslinkers. "Phenolic" will be understood as referring to polymers made from one or more phenolic monomers, such as phenol, bisphenol A, t-butyl-phenol and the like reacted with formaldehyde. Certain embodiments of the present invention use resole and/or novolac phenolics. Combinations of curing agents can be used.

In certain embodiments, the compositions of the present invention can be "epoxy free". "Epoxy free" and like terms mean that all components of the composition are substantially free from oxirane rings or residues of oxirane rings; bisphenol A; bisphenol A diglycidylether ("BADGE") or adducts of BADGE. In other embodiments, the compositions of the present invention can be epoxy-free and/or free from polyvinylchloride and/or related halide-containing vinyl polymers. For example, the film-forming resin of the present invention can be an acrylic, such as an acrylic crosslinked with a phenolic. Acrylic polymers can be (meth)acrylic acid and/or hydroxy alkyl esters of (meth)acrylic acid, such as hydroxyethylmethacrylate or hydroxypropyl(meth)acrylate; alkyl esters of (meth)acrylic can also be used, such as methyl(meth) acrylate, ethyl(meth)acrylate, butyl(meth)acrylate, and the like, as can 2-ethylhexyl(meth)acrylate, vinyl aromatic compounds such as styrene and vinyl toluene, nitriles such as (meth)acrylonitrile, and vinyl esters such as vinyl acetate. Any other acrylic monomers known to those skilled in the art could also be used. The term "(meth)acrylate" and like terms are used conventionally and herein to refer to both methacrylate and acrylate. In certain embodiments, combinations of acrylics can be used, for example, one having relatively low acid content (i.e. less than 25 percent acid functionality) and one having relatively high acid content (i.e. 30 percent acid content or higher). In certain embodiments, the average acid content of the acrylic is between 18 and 35, such as 26 to 27 percent. The weight average molecular weight of the acrylic can be, for example, 10,000 to 30,000, such as 16,000 to 27,000. In certain embodiments, one or more acrylics within these ranges are combined. It will be appreciated that acrylics having a very high molecular weight, i.e. 50,000 or greater, may form a film relatively quickly and trap water under the film, thereby forming blisters upon cure. Such a high molecular weight acrylic, however, may also help to keep the solids in the desired range. Therefore, the desired balance of blister resistance and solids control should be considered, and can be determined by one skilled in the art.

It was surprising that the amine-terminated polyamide, when used in conjunction with an acrylic and a phenolic in an epoxy-free composition, provided good corrosion resistance. One skilled in the art would recognize that the amine-terminated polyamide would form a salt with the acrylic, and would expect that salt to be water soluble thereby leading to poor adhesion, blush and other undesirable attributes. The results obtained when using the amine-terminated polyamide in conjunction with an acrylic and a phenolic in an epoxy-free formulation were therefore surprising. Previous coatings that contained only acrylics and phenolics had very poor corrosion resistance on drawn and wall ironed ("DWI") cans.

It will be appreciated that the present coatings are liquid coatings. In certain embodiments, the coatings of the present invention are water-borne or aqueous coatings. Aqueous coatings are generally preferred over solvent-based coatings for environmental reasons. It will be understood, however, that the term "aqueous" as used herein means that the coatings are predominantly water; small amounts, such as 20 weight percent or less (based on the total weight of the volatiles) of conventional solvents, such as alcohols, can be included and still be within the scope of the aqueous composition of the present invention. Indeed, the inclusion of a small amount of solvent, such as alcohol, is clearly within the aqueous compositions of certain embodiments of the present invention. The stability of the present aqueous compositions when using an epoxy-free acrylic formulation was also surprising; if the amine-terminated polyamide is too reactive, however, the compound may not stay in solution.

The present compositions can also comprise a pigment. Any suitable pigment can be used including, $TiO_2$, ZnO and MgO. Pigments are added for color and also for hiding and stain resistance in coatings for cans that will contain high sulfide foods, such as meats.

The compositions of the present invention can also contain any other conventional additives such as colorants, waxes, lubricants, defoamers, wetting agents, plasticizers, fortifiers and catalysts. Any mineral or sulfonic acid catalyst can be used as a catalyst. Particularly suitably for food can applications are phosphoric acid and dodecyl benzene sulfonic acid.

The present compositions can have a solid content of, for example, 20 to 45 weight percent, based on total weight of the coating. The particular solids content will vary based on the needs of the user and the method of application. For example, for spray application, a solids content of 23 to 28 weight percent, such as 25 to 26 weight percent, may be desired, while for roll coating a solids content of 35 to 40 weight percent may be desired. The film-forming resin is generally present in the coating composition in an amount ranging from 15 to 35 weight percent, such as 20 to 30 weight percent, with weight percent being based on the total resin solids of the coating. When a curing agent is used, it is generally present in an amount of up to 50 weight percent; this weight percent is based on total resin solids. The amine-terminated polyamide can be present in an amount ranging from 15 to 30 weight percent, such as 18 to 22 weight percent, with weight percent being based on the total resin solids. The water, solvent or water/solvent mixture can be present in amounts ranging from 60 to 77 weight percent, such as 68 to 75 weight percent with weight percent being based on total weight of the coating.

The present compositions have good wetting when coated on a metal surface. "Wetting" is a term used in the art to refer to the ability of a coating, particularly an aqueous coating, to cover a substrate with a continuous film, substantially free of defects. The compositions of the present invention when used to coat cans results in a very complete coverage of the metal surface of the can, particularly over wash coat that has splashed inside the cans and at the bead area of the cans, which have historically been spots where adequate coating coverage can be hard to achieve. Better coating coverage correlates with better corrosion resistance. Significantly, when using the amine-terminated polyamide in coatings according to the present invention, the performance of the coating is enhanced without having any negative impact on the coating. It is difficult to find additives that do not negatively effect performance of can coatings, because the requirements for the coating application are-so stringent; a very rapid high temperature cure is employed in coating the-cans and-the cans are subjected to very high temperatures and pressures after filling. Accordingly, the present invention is also directed to a food can coated with any of the coatings described herein. The food cans can be, for example, two piece or three piece cans. A "two-piece can" will be understood by those skilled in the art as referring to a DWI can. A "three-piece can" will be understood by those skilled in the art as referring to one that is coated in flat sheet, fabricated and welded. Normally, the two piece can is coated after fabrication and the three piece can is fabricated after coating.

The present invention is further directed to methods for coating food cans comprising applying to the food cans any of the coatings described herein. The methods of the present invention, employing the compositions described above, result in excellent wetting on the interior surface of the can. In the preparation of DWI food cans, a coating is often applied to the outside of the can that splashes inside the can; this coating is called a wash coat, and it generally contains a considerable amount of wax. Significantly, the present compositions even wet over the wash coat that has gotten on the inside of the food cans. The ability of a coating to cover or "wet" the inside of a food can is generally measured using an enamel rater test. This test generally involves pouring salt water into the can and running a current through the water; if the can is completely coated, there should be an enamel rater reading of 0 milliamps. Readings of up to about 25 milliamps are usually tolerated. The coatings of the present invention can consistently give enamel rater readings of less than 25, such as less than 10 or even less than 5.

In addition to the excellent wetting properties of the present coatings, the coatings also have the added advantage of being environmentally desirable. More specifically, the coatings have a low VOC as determined by the VOC minus water calculation. The VOC of the present coatings is typically less than or equal to about 3.4 pounds of solvent per gallon minus water. VOC values from 3.4 to 3.0 can be consistently achieved, with VOC values as low as 2.8 or even 2.6 also being attainable according to the present invention.

Coatings of the present invention can be prepared according to any method known in the art. For example, one or more acrylics can be neutralized with an amine, such as dimethylethylamine ("DMEA") to neutralize the acid to between 20 and 80 percent. Water can then be added to the acrylic. The amine-terminated polyamide can then be added; more water will typically be needed to achieve a manageable viscosity because of a viscosity increase after the polyamide add. The phenolic and/or other crosslinkers may be added after the amine-terminated polyamide and the second water add. Additional water may be added to adjust the product to the desired solids and viscosity. All of the additions can be achieved using a cowles blender.

The coating compositions of the present invention can be applied to the food can by any means known in the art such as rolling coating, spraying, and electrocoating. It will be appreciated that for two-piece food cans, the coating will typically be sprayed after the can is made. For three-piece food cans, a flat sheet will typically be roll coated with one or more of the present compositions first and then the can will be formed. As noted above, the percent solids of the composition can be adjusted based upon the means of application. The coating can be applied to a dry film weights of 24 mgs/4 $in^2$ to 12 mgs/4 $in^2$, such as 20 mgs/4 $in^2$ to 14 mgs/4 $in^2$.

After application, the coating is then cured. Cure is effected by methods standard in the art. For coil coating, this is typically a short dwell time (i.e. 9 seconds to 2 minutes) at high heat,(i.e. 485° F. peak metal temperature); coated metal sheets typically cure longer (i.e. 10 minutes) but at lower temperatures (i.e. 400° F. peak metal temperature). For spray applied coatings on two-piece cans, the cure can be from 5 to 8 minutes, with a 90-second bake at a peak metal temperature of 415° F. to 425° F.

Any material used for the formation of food cans can be treated according to the present methods. Particularly suitable substrates include tin-plated steel, tin-free steel, and black-plated steel.

The coatings of the present invention can be applied directly to the steel, without any pretreatment or adhesive aid being added to the metal first. In addition, no coatings need to be applied: over top of the coatings used in the present methods.

The compositions of the present invention perform as desired both in the areas of flexibility and corrosion/acid resistance. Significantly, in certain embodiments, these results can be achieved with an epoxy-free composition.

As used herein, unless otherwise expressly specified, all numbers such as those expressing values, ranges, amounts or percentages may be read as if prefaced by the word "about", even if the term does not expressly appear. Any numerical range recited herein is intended to include all sub-ranges subsumed therein. Plural encompasses singular and vice versa. For example, while the invention has been described in terms of "a" film-forming resin, "a" crosslinker, and "an" amine-terminated polyamide, one or more of any of these components can be used. Also, as used herein, the term "polymer" is meant to refer to prepolymers, oligomers and both homopolymers and copolymers; the prefix "poly" refers to two or more.

EXAMPLES

The following examples are intended to illustrate the invention, and should not be construed as limiting the invention in any way.

TABLE 1

Acrylic A

| Ingredients | Percent |
|---|---|
| Methacrylic acid | 17.5 |
| Styrene | 21 |
| Butyl acrylate | 11.5 |
| Butyl cellosolve | 35 |
| Butyl alcohol | 15 |
| TOTAL | 100 |

TABLE 2

Acrylic B

| Ingredients | Percent |
|---|---|
| Methacrylic acid | 9 |
| Styrene | 5 |
| Ethyl acrylate | 36 |
| Ethyl cellosolve | 35 |
| Butyl Alcohol | 15 |
| TOTAL | 100 |

TABLE 3

Acrylic C

| Ingredients | Percent |
|---|---|
| Methacrylic acid | 17.5 |
| Styrene | 5 |
| Ethyl acrylate | 27.5 |
| Butyl alcohol | 15 |
| Butyl cellosolve | 35 |
| TOTAL | 100 |

The acrylics of Tables 1, 2 and 3 were made in a reactor equipped with a condenser. The solvents were loaded and heat applied to 115° C. The monomers containing a free radical initiator were added over 3½ hours. An additional amount of initiator was added to complete conversion. The batch was held at temperature for one more hour and then cooled.

Coatings were prepared by mixing the components shown in Table 4.

TABLE 4

| | Sample 1 | Sample 2 | Sample 3 | Sample 4 |
|---|---|---|---|---|
| | (weights given in pounds) | | | |
| Acrylic A | 245 | 336 | 255 | 241 |
| Acrylic B | 244 | — | 255 | — |
| Acrylic C | — | 336 | — | 241 |
| Dimethylethanolamine | 40 | 50 | 43 | 40 |
| Deionized water | 400 | 400 | 400 | 400 |
| Amine-terminated polyamide[1] | 245 | 358 | 118 | 241 |
| Deionized water | 400 | 400 | 400 | 400 |
| Phenolic[2] | 235 | 254 | — | 436 |
| Phenolic[3] | 630 | 270 | 960 | 420 |
| Deionized water | 1140 | 1140 | 1122 | 1081 |
| Viscosity in No. 4 Ford cup | 25 seconds | 25 seconds | 25 seconds | 25 seconds |
| Solids | 27% | 26.6% | 26.5% | 27.5% |

[1]EPIKURE 3115 - 80% solids in butyl cellosolve.

[2]CIC-406 phenolic novolak, commercially available from Schenectady International, 62% solids in butyl cellosolve/butanol.

[3]DUREZ 29-112 phenolic resole, commercially available from Durez, 62% solids in butyl cellosolve/butanol.

Briefly, the acrylics were added to a cowles tank, the mixer was turned on and the amine was added. Then the first amount of deionized water was added until homogeneous. Then the amine-terminated polyamide was added and material was mixed for about 20 minutes. The second water add was made. Then the phenolics were added and mixed for about 20 minutes. The viscosity was adjusted with the remaining water.

TABLE 5

An epoxy-acrylic coating, Sample 5, was prepared by mixing the components shown in Table 5.

| | (weights given in pounds) |
|---|---|
| Epoxy-acrylic[4] | 9471 |
| Phenolic[5] | 2878 |
| Amine-terminated polyamide | 320 |
| Oleic acid | 37 |
| Caprylic acid | 37 |
| Butyl alcohol | 120 |
| Deionized water | 2500 |
| TOTAL | 15,363 |

[4]Prepared according to U.S. Pat. No. 4,212,781.
[5]DUREZ 29-108, commercially available from Durez, 60% solids in 50/50 butyl cellosolve/butanol.

The above coating had a solids content of 27% and a viscosity of 27 seconds in a No. 4 Ford cup.

The epoxy-acrylic was made by loading equal amounts of butanol and butyl cellosolve into a reactor equipped with a condenser. Solid epoxy-resin was added to reach 65% solids. The batch was heated to reflux. Acrylic monomers containing initiator were added in the ratio of methacrylic acid 1.0; ethyl acrylate 1.14; styrene 0.71 over two hours.

Then, additional butanol containing more initiator was added over 30 minutes and held for one hour. The solids after this step were about 62%. Dimethyl ethanol amine was added so as to neutralize the methacrylic acid 80%. Water was then added to reduce the solids to 25%.

The above coating was made by adding the epoxy-acrylic to a cowles tank. The mixer was turned on high; the phenolic was added and mixed 20 minutes. Then the amine-terminated polyamide was added and mixed 20 minutes. The oleic acid, caprylic acid and butanol were added and mixed for 20 minutes. The water was added slowly over 30 minutes and mixed 30 minutes.

The coatings were pac-tested in chicken noodle soup and three bean salad at a 60 minute, 250° F. steam process and storage at 120° F. for either one or two weeks, as indicted in Table 6. As can be seen in the table, results are excellent for chicken noodle soup as compared with a control and comparable to the control for three bean salad.

TABLE 6

| | 1 Week 120° F. (% Corrosion) | | | 2 Weeks 120° F. (% Corrosion) | | |
|---|---|---|---|---|---|---|
| Sample | Can 1 | Can 2 | Can 3 | Can 1 | Can 2 | Can 3 |
| | | Chicken Noodle | | | | |
| Sample 1 | 5 | 10 | 15 | 10 | 10 | 15 |
| Sample 2 | 10 | 10 | 20 | 15 | 15 | 20 |
| Sample 3 | 5 | 15 | 25 | 10 | 20 | 20 |
| Sample 4 | 5 | 10 | 10 | 10 | 10 | 10 |
| Sample 5 | 5 | 5 | 10 | 10 | 10 | 10 |
| Control[6] | 80 | 90 | 90 | 90 | 90 | 100 |
| | | Three Bean Salad | | | | |
| Sample 1 | 0 | 0 | 0 | 5 | 5 | 5 |
| Sample 2 | 20 | 20 | 25 | 25 | 25 | 30 |
| Sample 3 | 0 | 0 | 0 | 0 | 0 | 0 |
| Sample 4 | 0 | 0 | 0 | 0 | 0 | 0 |
| Sample 5 | 5 | 5 | 10 | 10 | 10 | 10 |
| Control[6] | 0 | 0 | 0 | 0 | 0 | 0 |

[6]Prepared according Sample 4, without amine-terminated polyamide.

Whereas particular embodiments of this invention have been described above for purposes of illustration, it will be evident to those skilled in the art that numerous variations of the details of the present invention may be made without departing from the invention as defined in the appended claims.

What is claimed is:

1. A composition for coating food cans comprising: a film-forming resin and an amine-terminated polyamide wherein the composition is epoxy free and wherein the composition further comprises a phenolic crosslinker.

2. The composition of claim 1, wherein the amine-terminated polyamide has a viscosity of 50,000 to 75,000 cps at 40° C.

3. The composition of claim 1, wherein the amine-terminated polyamide comprises 10 to 35 of the total solid weight of the composition.

4. The composition of claim 1, wherein the composition is aqueous.

5. The composition of claim 1, wherein the phenolic crosslinker is a resole and/or novolac.

6. The composition of claim 1, wherein the film-forming resin further comprises an acrylic resin.

7. The composition of claim 6, wherein the acrylic resin has an average acid level of 18 to 35.

8. A food can coated with the composition of claim 6.

9. A method of coating a food can comprising applying to said food can the coating of claim 6.

10. A food can coated with the composition of claim 1.

11. A food can according to claim 10, wherein the food can is a two-piece can.

12. A food can according to claim 10, wherein the food can is a three-piece can.

13. A method of coating a food can comprising applying to said food can the coating of claim 1.

14. The method of coating a food can according to claim 13, wherein the coating is spray applied to the can.

15. The composition of claim 1, wherein the film-forming resin and amine-terminated polyamide are in one component of a one component composition.

* * * * *